(12) United States Patent
Chen

(10) Patent No.: US 7,145,769 B2
(45) Date of Patent: Dec. 5, 2006

(54) PORTABLE LIQUID CRYSTAL DISPLAY AND THE TABLET PC

(75) Inventor: Wei-Chou Chen, Hsinchu (TW)

(73) Assignee: Hannstar Display Corporation, Taoyuan (TW)

( * ) Notice: Subject to any disclaimer, the term of this patent is extended or adjusted under 35 U.S.C. 154(b) by 0 days.

(21) Appl. No.: 10/904,425

(22) Filed: Nov. 10, 2004

(65) Prior Publication Data

US 2006/0056138 A1   Mar. 16, 2006

(30) Foreign Application Priority Data

Sep. 15, 2004   (TW) .............................. 93127818 A

(51) Int. Cl.
*G06F 1/16*   (2006.01)

(52) U.S. Cl. ................... 361/681; 349/58; D14/375

(58) Field of Classification Search ............... 316/681, 316/682, 683; 349/58; D14/375
See application file for complete search history.

(56) References Cited

U.S. PATENT DOCUMENTS

| 6,182,169 | B1 * | 1/2001 | Force et al. ................. 361/683 |
| 6,532,152 | B1 * | 3/2003 | White et al. ................. 361/681 |
| 6,560,092 | B1 * | 5/2003 | Itou et al. .................... 361/681 |
| 6,628,508 | B1 * | 9/2003 | Lieu et al. ................... 361/681 |
| 6,771,329 | B1 * | 8/2004 | Hung et al. .................... 349/58 |

* cited by examiner

*Primary Examiner*—Lisa Lea-Edmonds
(74) *Attorney, Agent, or Firm*—Jianq Chyun IP Office

(57) ABSTRACT

A portable liquid crystal display and a Tablet PC are disclosed. The portable liquid crystal display comprises a liquid crystal display panel and a case. The liquid crystal display panel comprises a display area. The case encases the liquid crystal display panel, and exposes the display area outside the case. Wherein, the case comprises an opening. The Tablet PC comprises a liquid crystal panel, a computer-hardware, and a case. The liquid crystal panel comprises a display area. The computer-hardware is electrically connected with the liquid crystal display panel. The case encases the liquid crystal display panel and the computer-hardware, and exposes the display area outside the case. Wherein, the case comprises an opening or gap.

12 Claims, 6 Drawing Sheets

PORTABLE LIQUID CRYSTAL DISPLAY AND THE TABLET PC

CROSS-REFERENCE TO RELATED APPLICATION

This application claims the priority benefit of Taiwan application serial no. 93127818, filed on Sep. 15, 2004.

BACKGROUND OF THE INVENTION

The present invention relates generally to a portable liquid crystal display and a Tablet PC, and more particularly, to a portable liquid crystal display and a Tablet PC with an easy-to-carry opening or gap.

Following the fast and intensive development of multimedia technology, the fashion of image delivering has transformed from analog to digital transmission. Besides, to fit the modern life style, the size of video or image devices has become minimized. Conventional cathode Ray Tube (CRT) display has the advantages of excellent display quality and low manufacturing cost; however, the CRT cannot meet the requirement of a thinner, lighter display with lower power consumption due to the structure of the electronic chamber therein. Additionally, the radiation emitted is still a concern for consumers. Therefore, with the improvement of optoelectronics and semiconductor technology, Flat Panel Display (FPD) is thriving in the market. Among various FPD products, liquid crystal display (LCD) becomes the mainstream display to replace the conventional cathode ray tube as it can be operated under low voltage without radiation, and has a thinner and lighter body.

The more development of liquid crystal display technology, the more applications are explored. The most popular applications are mobile phones, personal digital assistants (PDAs), liquid crystal display monitor (LCD monitor), liquid crystal display television (LCD TV), Notebook, Tablet PC . . . etc.

FIG. 1 illustrates a conventional three-dimensional liquid crystal display 100. The liquid crystal display 100 comprises a liquid crystal display panel 110 and a case 120. The liquid crystal display panel 110 comprises a display area 112. The liquid crystal display panel 110 is encased by the case 120 but the displaying area 112 is exposed outside the case 120. It should be noted that these liquid crystal displays are not immediately portable or movable.

FIG. 2A shows a three-dimensional Tablet PC, and FIG. 2B is a cross-sectional view of the Tablet PC of FIG. 2A. Referring to FIGS. 2A and 2B, the Tablet PC 200 comprises a liquid crystal display panel 210, a computer hardware 230 and a case 220. The liquid crystal display panel 210 comprises a display area 212 and the computer hardware 230 is electrically connected to the liquid crystal display panel 210. The liquid crystal display panel 210 and computer hardware 230 are encased by the case 220, but the display area 212 is exposed outside the case 220.

Please refer to FIG. 2A. Tablet PC 200 could provide not only the display function but also data transmission via wireless connection with a server. Besides, Tablet PC 200 has the function of simple data processing, which comes in handy for users on the go.

Please further refer to FIG. 1 and FIG. 2A. Conventional liquid crystal display 100 or Tablet PC 200 is not made for carrying around and can be easily damaged when falling. To prevent this problem, the designs of easy-to-carry liquid crystal displays and Tablet computers are imperative.

SUMMARY OF THE INVENTION

Accordingly, the present invention is directed to a portable crystal display, which is easy to carry and unlikely to fall.

The present invention is also directed to a Tablet PC, which is easy to carry and unlikely to fall.

The present invention provides a portable liquid crystal display, comprising a liquid crystal display panel and a case. Wherein, the liquid crystal display panel comprises a display area, and the liquid crystal display panel is encased by the case, but the display area is exposed outside the case. Besides, there is at least one closed-opening in the case. The closed-opening is used to be pierced through by a supporting means to carry the portable liquid crystal display.

In the portable liquid crystal display according to one embodiment of the present invention, the closed-opening can be a round hole, an elliptic hole, a polygon hole, or other irregular holes. Besides, the supporting means can be a rope.

The present invention provides another portable liquid crystal display, comprising a liquid crystal display panel and a case. Wherein, the liquid crystal display panel comprises a display area, and the liquid crystal display panel is encased by the case, but the display area is exposed outside the case. Besides, there is at least one unclosed-opening in the case. The unclosed-opening is used to be pierced through by a supporting means to carry the portable liquid crystal display.

In the portable liquid crystal display according to one embodiment of the present invention, the opening can be a round hole, an elliptic hole, a polygon hope, or other irregular holes. Besides, the supporting means can be a rope.

The present invention provides a Tablet PC, comprising a liquid crystal display panel, a computer hardware and a case. Wherein, the liquid crystal display panel comprises a display area and the computer hardware is electrically connected to the liquid crystal display panel. Besides, the liquid crystal display panel and computer hardware are encased by the case, but the display area is exposed outside the case. Additionally, there is one closed-opening in the case, and the closed-opening is used to be pierced through by a supporting means to carry the portable liquid crystal display.

In the Tablet PC according to one embodiment of the present invention, the closed-opening can be a round hole, an elliptic hole, a polygon hole, and other irregular holes. Besides, the supporting means can be a rope.

The present invention provides another Tablet PC, comprising a liquid crystal display panel, a computer hardware and a case. Wherein, the liquid crystal display panel comprises a display area and the computer hardware is electrically connected to the liquid crystal display panel. Besides, the liquid crystal display panel and computer hardware are encased by the case, but the display area is exposed outside the case. Additionally, there is one unclosed-opening in the case, and the unclosed-opening is used to be pierced through by a supporting means to carry the portable liquid crystal display.

In the Tablet PC according to one embodiment of the present invention, the unclosed-opening can be a round hole, an elliptic hole, a polygon hole, and other irregular holes. Besides, the supporting means can be a rope.

The portable liquid crystal display and the Tablet PC in the present invention are easy to carry and unlikely to fall due to the closed-opening or unclosed-opening in the case.

It is to be understood that the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate exemplary embodiments of the invention, and together with the description, serve to explain the principles of the invention.

DETAILED DESCRIPTION OF THE EMBODIMENTS

Several exemplary embodiments of the invention will now be described in detail with reference to the accompanying drawings.

Figure 1:
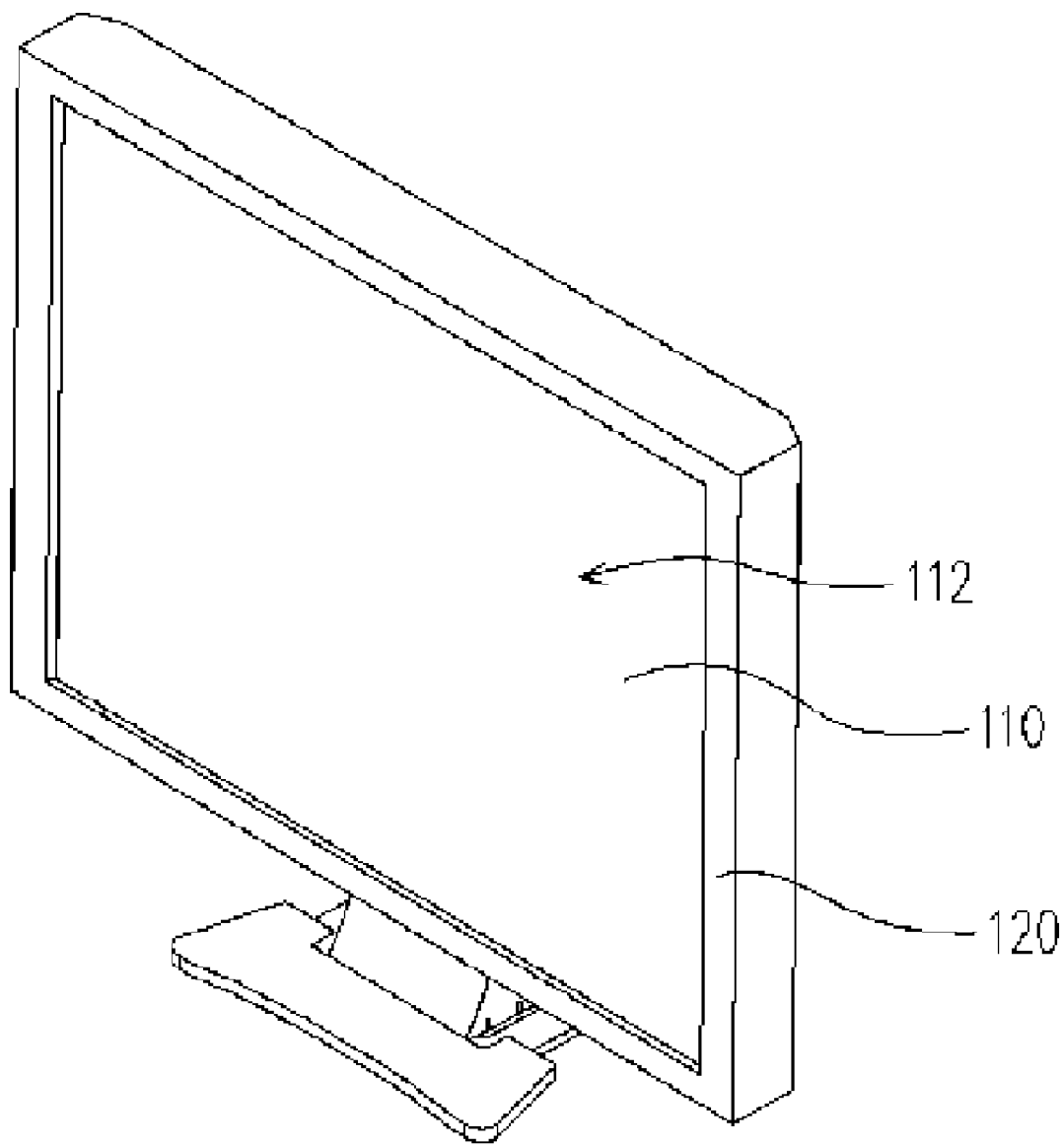
FIG. 1 is a three-dimensional diagram of the conventional liquid crystal display.
Figure 2A:
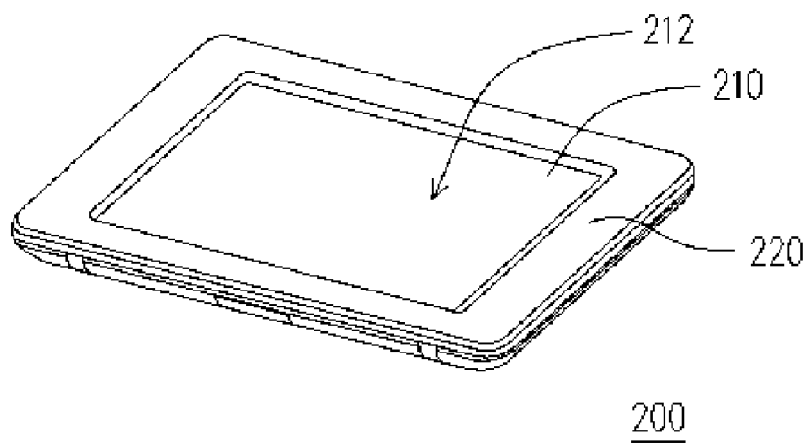
FIG. 2A is a three-dimensional diagram of the conventional Tablet PC.
Figure 2B:
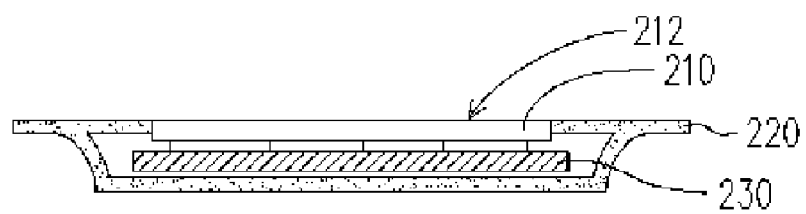
FIG. 2B is a cross section view of FIG. 2A.
Figure 3:
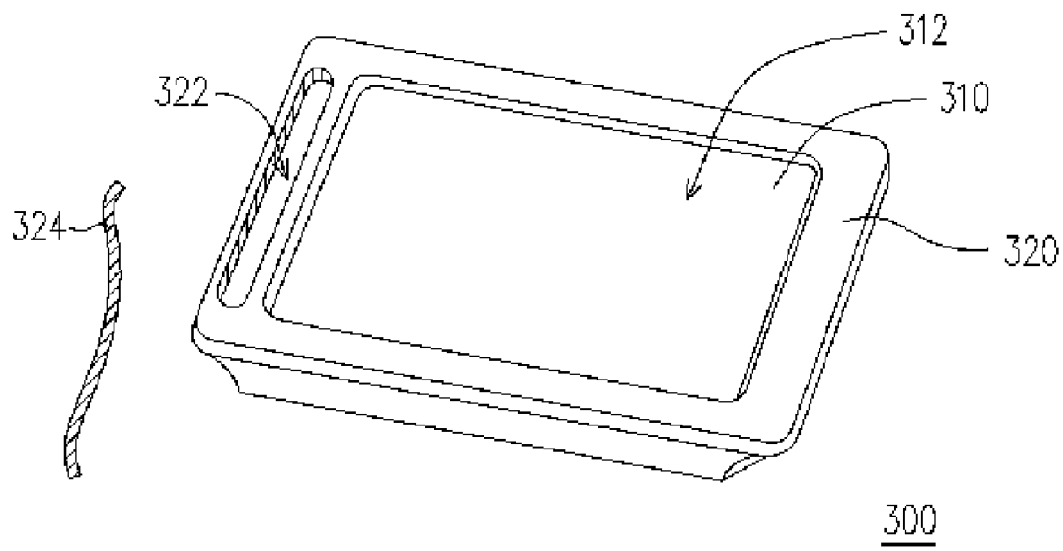
FIG. 3 is a three-dimensional diagram of the portable liquid crystal display according to the first embodiment of the present invention.

FIG. 3 is a three-dimensional diagram of the portable liquid crystal display according to one embodiment of the present invention. The portable liquid crystal display comprises a liquid crystal display panel 310 and a case 320. The liquid crystal display panel 310 is encased by the case 310 but the display area 312 on the liquid crystal display panel 310 is exposed outside the case 310. In addition, there is at least one closed-opening 322 to be pierced through by the supporting means 324 (a rope in this embodiment) to move the portable liquid crystal display 300.

Figure 4A:
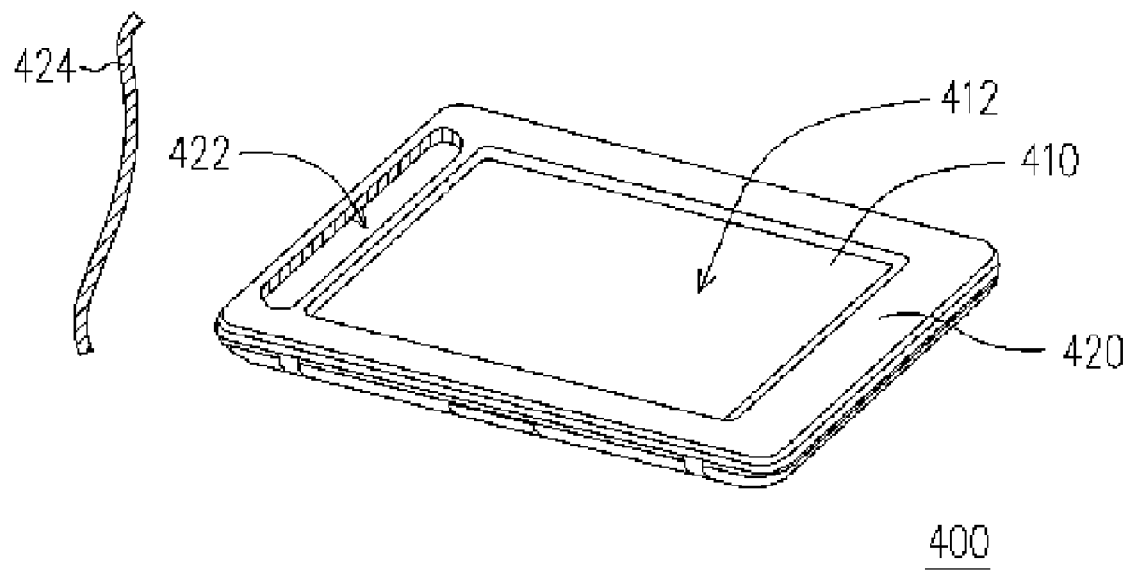
FIG. 4A is a three-dimensional diagram of the Tablet PC according to the first embodiment in the present invention
Figure 4B:
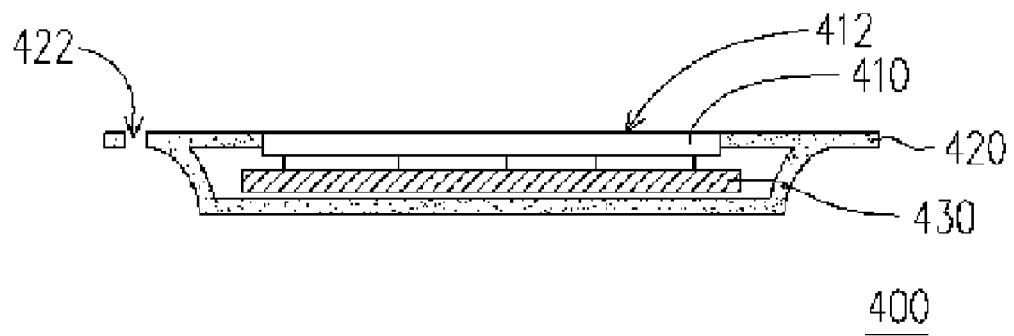
FIG. 4B is a cross-sectional view of the Tablet PC in 4A.

FIG. 4 illustrates a three-dimensional Tablet PC according to the first embodiment of the present invention. FIG. 4B is the cross-sectional view of the Tablet PC in FIG. 4A. Please refer to FIGS. 4A and 4B. The Tablet PC 400 in the present embodiment comprises a liquid crystal display panel 410, a computer hardware 430 and a case 420. Wherein, the liquid crystal display panel 410 comprises a display area 412 and the computer hardware 430 is electrically connected to the liquid crystal display panel 410. The liquid crystal display panel 410 and computer hardware 430 are encased by the case 420, but the display area 412 is exposed outside the case 420. Besides, there is at least one closed-opening 422 to be pierced through by the supporting means 424 (a rope in this embodiment) to move the portable liquid crystal display 400.

Figure 5A:
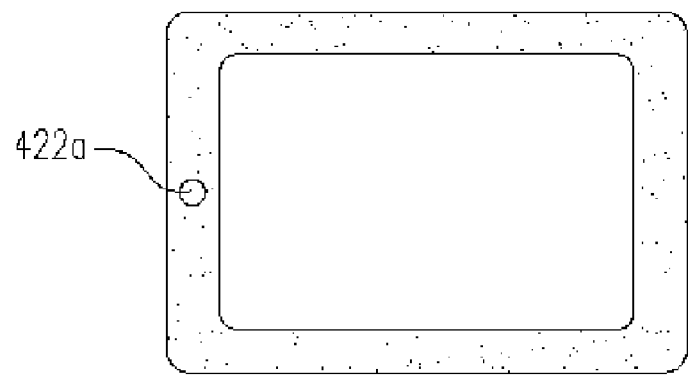
FIGS. 5A through 5C illustrate the portable liquid crystal display with different shapes of the closed-opening.
Figure 5B:
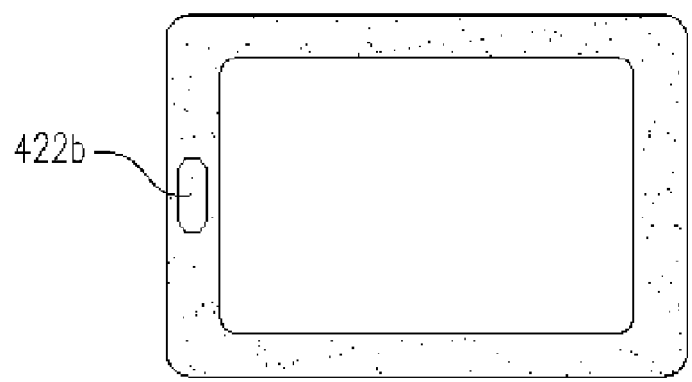
Figure 5C:
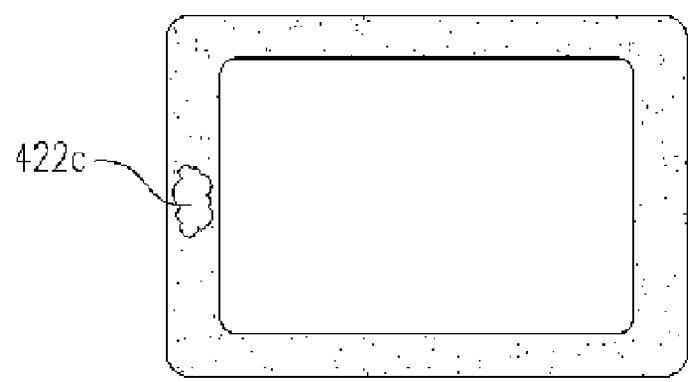

Please refer to FIG. 3 and FIG. 4A. It should be noted that the opening 322, 422 is not limited to an elliptic hole, but can be other shapes suitable for carrying. FIGS. 5A through 5C show the portable liquid crystal display with different shapes of the opening. Referring to FIGS. 5A to 5C, closed-openings 322, 422 can be a round hole 422a, a polygon hole 422c, an irregular hole 422c or any other suitable shapes.

Figure 6:
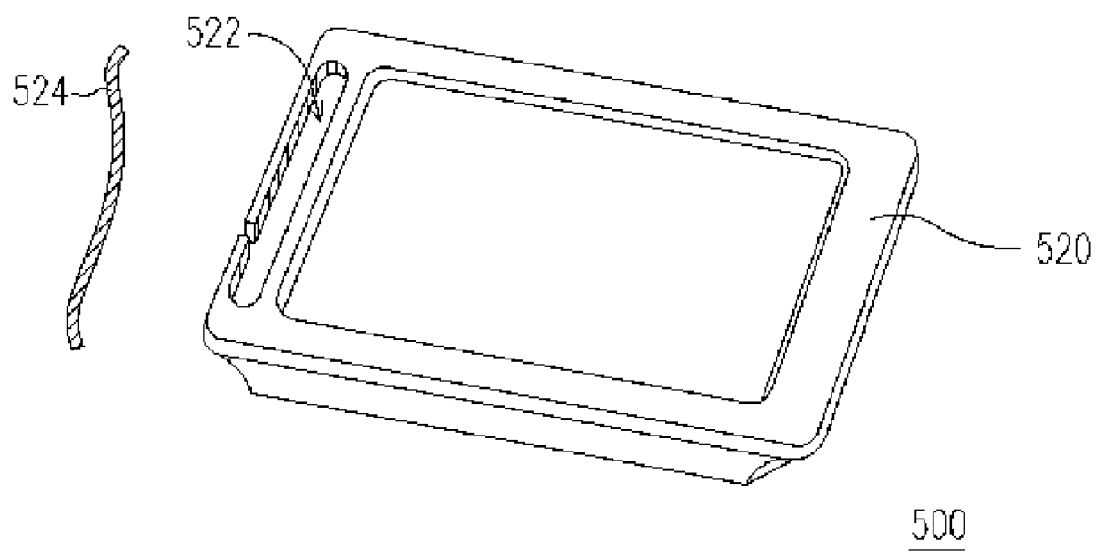
FIG. 6 is a three-dimensional diagram of the portable liquid crystal display according to the second embodiment of the present invention.

FIG. 6 illustrates a three-dimensional portable liquid crystal display according to the second embodiment of the present invention. The portable liquid crystal display 500 is similar to the portable liquid crystal display 300 (shown in FIG. 3). The only difference is that there is at least a unclosed-opening 522 in the case 520. This unclosed-opening is used to be passed through by the supporting means 524 (a rope in this embodiment) to move the portable liquid crystal display 500. The rest parts of the portable liquid crystal display 500 are similar to those of the portable liquid crystal display 300. Detailed description is not repeated.

Figure 7:
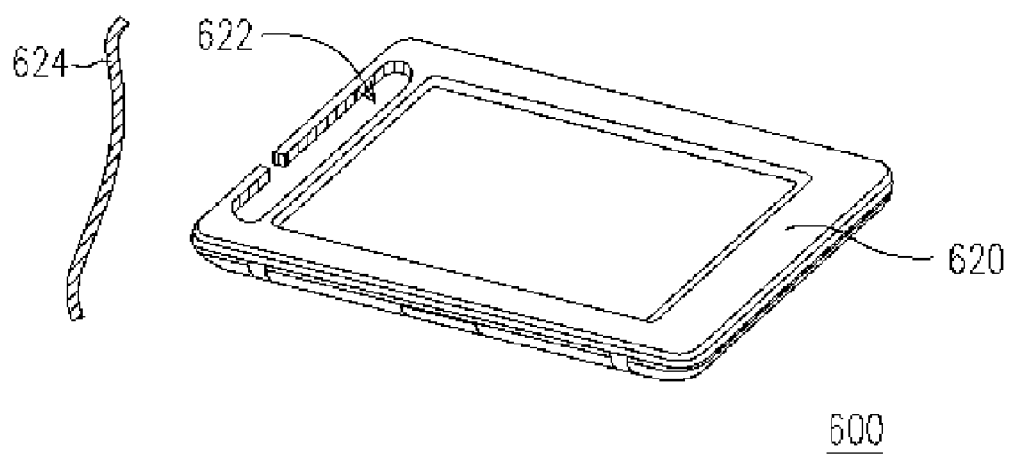
FIG. 7 is a three-dimensional diagram of the Tablet PC according to the second embodiment of the present invention.

FIG. 7 illustrates the three-dimensional Tablet PC according to the second embodiment of the present invention. Referring to FIG. 7, the Tablet PC 600 of the second embodiment is similar to the Tablet PC 400 (shown in FIG. 4) of the first embodiment. The only difference is that there is at least a unclosed-opening 622 in the case 620. The gap 622 is used to be passed through by the supporting means 624 (a rope in this embodiment) to move the Tablet PC 600. The rest parts of the Tablet PC 600 are similar to those of the Tablet 400 shown in FIG. 4A, and detailed description is not repeated.

Figure 8A:
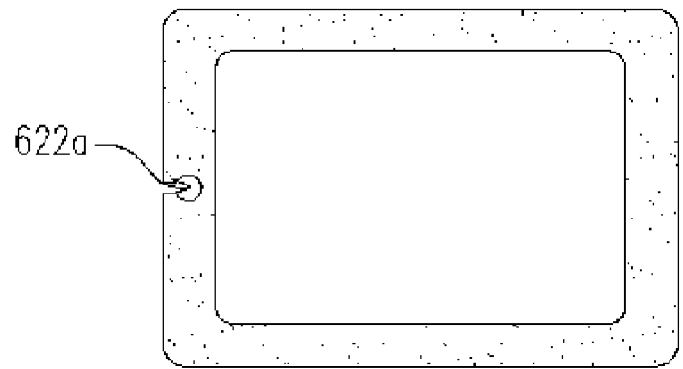
FIGS. 8A through 8C illustrate the Tablet PC with different shapes of the unclosed-opening.
Figure 8B:
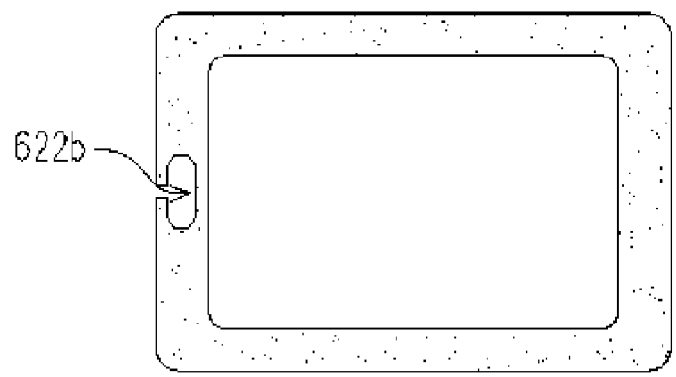
Figure 8C:
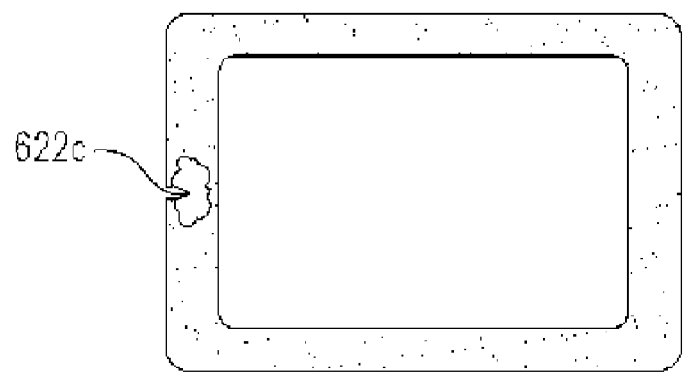

Please refer to FIG. 6 and FIG. 7. It should be noted that the unclosed-opening 522, 622 are not limited to the elliptic hole, but can be other shapes suitable for carrying. FIGS. 8A through 8C show the Tablet PC with different shapes of the unclosed-opening. Please refer to FIGS. 8A to 8C and FIGS. 5A to 5C. The unclosed-opening 622 can be a round gap 622a, a polygon hole 622b, an irregular hole 622c, or any other shapes suitable for carrying.

In conclusion, the portable liquid crystal display and the Tablet PC in the present invention comprise a closed-opening or an unclosed-opening in the case, thus allowing the users to carry the devices by reaching through the closed-opening or the unclosed-opening. Alternatively, users can use the rope (not shown in the drawings) to pierce through the closed-opening or the unclosed-opening to carry the portable liquid crystal display or Tablet PC. Accordingly, the users do not have to worry about dropping the portable liquid crystal display or Tablet PC when carrying. Besides, the portable liquid crystal display or Tablet PC can be further hung on the wall by the closed-opening or unclosed-opening.

The above description discloses several embodiments of the present invention. This invention is susceptible to modifications in the designs, as well as alterations in the equipment. Such modifications will become apparent to those skilled in the art from a consideration of this disclosure or practice of the invention disclosed herein. Consequently, it is not intended that this invention be limited to the specific embodiments disclosed herein, but that it cover all modifications and alternatives coming within the true scope and spirit of the invention as embodied in the attached claims.

What is claimed is:

1. A portable liquid crystal display, comprising:
   a liquid crystal display panel with a display area; and
   a case, encasing the liquid crystal display panel and exposing the display area at a first surface of the case, wherein the case comprises at least one opening formed through the first surface and a second surface opposite to the first surface of the case, and a supporting means is pierced through the opening for carrying the portable liquid crystal display.

2. A portable liquid crystal display at claim 1, wherein the opening is a closed-opening, and said closed-opening a round hole, an elliptic hole, a polygon hole, and other irregular holes.

3. A portable liquid crystal display of claim 1, wherein the opening is an unclosed-opening, and said unclosed-opening comprises a round hole, an elliptic hole and, a polygon hole, and other irregular holes.

4. A portable liquid crystal display of claim 1, wherein the supporting means comprises a rope.

5. The portable liquid crystal display of claim 1, wherein all sides of the opening is defined by the case.

6. The portable liquid crystal display of claim 1, wherein the opening extends substantially along an entire side of the case.

7. A Tablet PC, comprising:
a liquid crystal display panel with a display area; a computer hardware, electrically connected to the liquid crystal display panel; and
a case, encasing the liquid crystal display panel and exposing the display area at a first surface of the case, wherein the case comprises at least one opening formed through the first surface and a second surface opposite to the first surface of the case, and a supporting means is pierced through the opening for carrying the portable liquid crystal display.

8. A Tablet PC of claim 7, wherein the opening is a closed-opening and comprising a round hole, an elliptic hole, a polygon hole, and other irregular holes.

9. A Tablet PC of claim 7, wherein the opening is an unclosed-opening and comprising a round hole, an elliptic hole, a polygon hole, and other irregular holes.

10. A Tablet PC of claim 7, wherein the supporting means comprises a rope.

11. The Tablet PC of claim 7, wherein all sides of the opening is defined by the case.

12. The Tablet PC of claim 7, wherein the opening extends substantially along an entire side of the case.

* * * * *